United States Patent Office 3,658,789
Patented Apr. 25, 1972

3,658,789
DRUG GLYCEROL KETALS
John H. Fried, Palo Alto, Calif., assignor to Syntex
Corporation, Panama, Panama
No Drawing. Filed Jan. 19, 1970, Ser. No. 4,021
Int. Cl. C07c 173/00
U.S. Cl. 260—239.55 C                     7 Claims

ABSTRACT OF THE DISCLOSURE

Drug glycerol ketals represented by the formula $$\begin{array}{c} H_2C-O-H \\ HC-O \\ \phantom{HC}\phantom{-}\diagdown \\ \phantom{HC-O-}D^1 \\ \phantom{HC}\phantom{-}\diagup \\ H_2C-O \end{array}$$

in the formula, $D^1$ is the remainder of a drug moiety.

These compounds exhibit the pharmaceutical utilities of the parent drugs but have enhanced and prolonged activity when orally administered.

---

This invention relates to drug glycerol ketals.

In summary, the compound of this invention can be represented by the formula:

$$\begin{array}{c} H_2C-O-H \\ HC-O \\ \phantom{HC}\phantom{-}\diagdown \\ \phantom{HC-O-}D^1 \\ \phantom{HC}\phantom{-}\diagup \\ H_2C-O \end{array}$$
(I)

In the above formula, $D^1$ is a remainder of a drug moiety.

The compounds of Formula I can be prepared by a procedure which can be represented as follows:

$$D^1{=}O \longrightarrow \begin{array}{c} H_2C-O-H \\ HC-O \\ \phantom{HC}\diagdown \\ \phantom{HC-O-}D^1 \\ \phantom{HC}\diagup \\ H_2C-O \end{array}$$
(A)                (I)

In the above formulas, $D^1$ is as previously defined.

In the above procedure, the ketones of Formula A are reacted with glycerol and dry methyl orthoformate in a suitable inert organic solvent in the presence of perchloric acid to yield the glycerol ketals of Formula I.

Included within Formula I are conjugates of steroid ethers corresponding to Formula A. These steroid ethers which are ketones which have been described together with methods for their preparation in United States patent applications Ser. No. 731,300 filed May 22, 1968, Ser. No. 731,301 filed May 22, 1968 and Ser. No. 731,267 filed May 22, 1968 and U.S. Pats. Nos. 3,365,446, 3,067,-194 and 3,364,203.

Representative glycerol ketals of anabolic steroids within Formula I can be represented by the following formulas:

(II)                (III)

(IV)

(V)                (VI)

in the above formulas, $R^{10}$, $R^{11}$, $R^{13}$, $R^{15}$, $R^{22}$ and $R^{23}$ each is hydrogen or methyl (preferably one of $R^{22}$ and $R^{23}$ is methyl);

$R^{12}$ is hydrogen or lower alkyl;

$R^{14}$ is hydrogen or chloro;

$R^{16}$ is hydroxy, or a conventional hydrolyzable ester or ether thereof;

$R^{17}$ is methyl or ethyl;

$R^{19}$, $R^{20}$, and $R^{25}$ each is hydrogen, methyl, fluoro, or chloro; and $R^{20}$ is not present when $Z^1$ is a double bond;

$Z^1$ and $Z^2$ each is a single bond or a double bond.

The glycerol ketals of Formulas II–VI are anabolic agents with a favorable anabolic:androgenic ratio, also possess anti-estrogenic, anti-gonadotrophic, and anti-fibrillatory activities, and can be used in the same manner as testosterone. These compounds are preferably administered orally. However, they can also be administered by other usual routes such as parenterally. In either manner of administration they can be administered either alone or in conjunction with other medicinal agents, or in pharmaceutically acceptable, non-toxic compositions formed by the incorporation of any of the normally employed excipients.

The terms "(lower)alkyl" and derivatives thereof appearing in the above and following definitions for steroids denote alkyl in the above and following definitions for steroids denote alkyl groups containing from one to six carbon atoms, inclusive, such as methyl, ethyl, propyl, isopropyl, butyl, isobutyl, t-butyl, pentyl, amyl, hexyl and the like.

The term "conventional hydrolyzable ester" as used therein denotes those hydrolyzable ester groups conventionally employed in the steroid art, preferably those derived from hydrocarbon carboxylic acid or phosphoric acid and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecanoate, phenoxyacetate, benzoate, phenylacetate, diphenylacetate, diethylacetate, trimethylacetate, t-butylacetate, trimethylhexanoate, methylneopentylacetate, cyclohexylaceate, cyclopentylpropionate, adamantoate, glycolate, methoxyacetate, hemisuccinate, hemiadipate, hemi-β,β-dimethylglutarate, acetoxyacetate, 2 - chloro - 4-nitrobenzoate, aminoacetate, diethylaminoacetate, piperidinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like. The term "conventional hydrolyzable ethers" include tetrahydropyran-2'-yl, tetrahydrofuran-2'-yl, and 4'-(lower)alkoxy - 4'-tetrahydrofuran-4'-yl ethers and the like.

By the term "aryl" are included aryl, aralkyl, and alkaryl groups, such as phenyl, p-chlorophenyl, p-methoxyphenyl, benzyl, phenthyl, tolyl, ethylphenyl, and the like. The wavy line (∫) designates and includes both the alpha and beta configurations.

Representative glycerol ketals of anabolic steroids according to this invention can be prepared from the following exemplary ketones by the above procedure.

TABLE A 19-norandrost-4-en-17β-ol-3-one,
5α,19-norandrost-17β-ol-3-one,
2α-methyl-5α,19-norandrost-17β-ol-3-one,
2α-methyl-5α-androst-17β-ol-3-one,
4α-methyl-5α,19-norandrost-17β-ol-3-one,
2α,17α-dimethyl-5α,19-norandrost-17β-ol-3-one,
4α-methyl-17α-ethyl-5α-androst-17β-ol-3-one,
4α-methyl-5α-androst-17β-ol-3-one,
androst-4-en-17β-ol-3-one,
17α-methylandrost-4-en-17β-ol-3-one,
17α-ethylandrost-4-en-17β-ol-3-one,
17α-propylandrost-4-en-17β-ol-3-one,
7α-methylandrost-4-en-17β-ol-3-one,
4-chloroandrost-4-en-17β-ol-3-one,
19-norandrost-4-en-17β-ol-3-one,
17α-methyl-19-norandrost-4-en-17β-ol-3-one,
17α-ethyl-19-norandrost-4-en-17β-ol-3-one,
17α-propyl-19-norandrost-4-en-17β-ol-3-one,
7α-methyl-19-norandrost-4-en-17β-ol-3-one,
7α,17α-dimethyl-19-norandrost-4-en-17β-ol-3-one,
4-chloro-19-norandrost-4-en-17β-ol-3-one,
3-methyl-5α-androst-1-en-17β-ol-3-one,
1-methyl-5α-androst-1-en-17β-ol-3-one,
1-methyl-17α-methyl-5α-androst-1-en-17β-ol-3-one,
1-methyl-17α-ethyl-5α-androst-1-en-17β-ol-3-one,
2-methyl-5α-androst-1-en-17β-ol-3-one,
2-methyl-17α-methyl-5α-androst-1-en-17β-ol-3-one,
2-methyl-17α-ethyl-5α-androst-1-en-17β-ol-3-one,
17β-hydroxy-18-methylandrost-4-en-3-one,
17β-hydroxy-17α,18-dimethylandrost-4-en-3-one,
17β-hydroxy-6α,17α,18-trimethylandrost-4-en-3-one,
17β-hydroxy-6α,18-dimethyl-17α-ethylandrost-4-en-3-one,
17β-hydroxy-6α,17α-dimethylandrost-4-en-3-one,
17β-hydroxy-6α-methylandrost-4-en-3-one,
17β-hydroxyandrost-4-en-3-one,
17β-hydroxy-18-methylandrosta-4,6-dien-3-one,
17β-hydroxy-17α,18-dimethylandrosta-4,6-dien-3-one,
17β-hydroxy-6α,17α,18-trimethylandrosta-4,6-dien-3-one,
17β-hydroxy-6α,18-dimethyl-17α-ethylandrosta-4,6-dien-3-one,
17β-hydroxy-6α,17α-dimethylandrosta-4,6-dien-3-one,
17β-hydroxy-6α-methylandrosta-4,6-dien-3-one,
17β-hydroxy-18-methyl-19-norandrost-4-en-3-one,
17α,18-dimethyl-17β-hydroxy-19-norandrost-4-en-3-one,
6α,17α,18-trimethyl-17β-hydroxy-19-norandrost-4-en-3-one,
17β-hydroxy-6α,18-dimethyl-17α-ethyl-19-norandrost-4-en-3-one,
17β-hydroxy-6α,17α-dimethyl-19-norandrost-4-en-3-one,
17β-hydroxy-6α-methyl-19-norandrost-4-en-3-one,
17β-hydroxy-19-norandrost-4-en-3-one,
17β-hydroxy-18-methyl-19-norandrosta-4,6-dien-3-one,
17β-hydroxy-17α,18-dimethyl-19-norandrosta-4,6-dien-3-one,
17β-hydroxy-6α,17α,18-trimethyl-19-norandrosta-4,6-dien-3-one,
17β-hydroxy-6α,18-dimethyl-17α-ethyl-19-norandrosta-4,6-dien-3-one,
17β-hydroxy-6α,17α-dimethyl-19-norandrosta-4,6-dien-one,
17β-hydroxy-6α-methyl-19-norandrosta-4,6-dien-3-one,
17β-hydroxy-6α-fluoro-17α-methyl-19-norandrosta-4,6-dien-3-one, and
17β-hydroxy-6α-fluoro-17α,18-dimethyl-19-norandrost-4-en-3-one.

Representative glyceral ketals of corticoid steroids within Formula I can be represented by the formula:

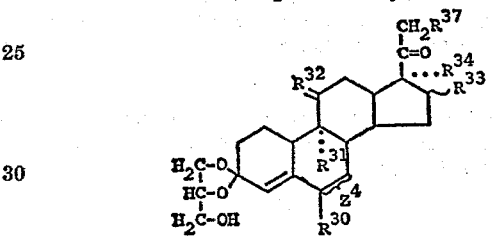

(VII)

In the above formula,
$R^{30}$ is hydrogen, methyl, fluoro, or chloro and when $Z^4$ is a single bond, $R^{30}$ can be either α or β oriented;
$R^{31}$ is hydrogen, chloro or fluoro;
$R^{32}$ is keto or

wherein $R^{32a}$ is hydroxy, chloro, or fluoro;
$R^{33}$ is hydrogen, methyl, hydroxy, or conventional hydrolyzable esters thereof;
$R^{34}$ is hydrogen, hydroxy, conventional hydrolyzable esters thereof, or when taken together with $R^{33}$,

$R^{35}$ is hydrogen or alkyl of up to eight carbons;
$R^{36}$ is hydrogen, alkyl, or an aryl group of up to eight carbons;
$R^{37}$ is chloro, fluoro, hydroxy, conventional hydrolyzable esters thereof or conventional hydrolyzable ethers thereof;
$Z^4$ is a single bond, double bond, or $$\substack{R^{67} \\ \diagup \\ C \\ \diagdown \\ R^{68}}$$

each of $R^{67}$ and $R^{68}$ is hydrogen, chloro, or fluoro.

The glycerol ketals of Formula VII have corticoid activity and are accordingly useful as anti-inflammatory agents. They are useful for the same purposes as hydrocortisone. These compounds are preferably administered orally. However, they can also be administered parenterally or topically. In any manner of administration, they can be administered either singly, in conjunction with other medicinal agents, or in pharmaceutically acceptable non-toxic compositions formed by the incorporation of any of the normally employed excipients.

Representative glycerold ketals of corticoid steroids according to this invention can be prepared from the following exemplary ketones by the above procedure:

TABLE B pregn-4-en-21-ol-3,20-dione,
pregna-1,4-diene-11β,17α,21-triol-3,20-dione,
6α,9α-difluoro-16α,17α-isopropylidenedioxy-pregna-1,4-diene-11β,21-diol-3,20-dione,
6α-fluoro-16α,17α-isopropylidenedioxypregna-1,4-diene-11β,21-diol-3,20-dione,
9α-fluoro-16α,17α-isopropylidenedioxypregna-1,4-diene-11β,21-diol-3,20-dione,
6α-fluoro-9α,11β-dichloro-16α,17α-isopropylidene-dioxypregna-1,4-dien-21-ol-3,20-dione,
6α-chloro-16α,17α-isopropylidenedioxy-pregna-1,4-diene-11β,21-diol-3,20-dione,
6α,9α-difluoro-16α,17α-isopropylidenedioxypregn-4-en-11β,21-diol-3,20-dione,
6α-fluoro-16α,17α-isopropylidenedioxypregn-4-en-11β,21-diol-3,20-dione,
9α-fluoro-16α,17α-isopropylidenedioxypregn-4-en-11β,21-diol-3,20-dione,
6α,9α-difluoro-16β-methyl-17α-valeroxypregn-1,4-diene-11β,21-diol-3,20-dione,
6α-fluoro-16β-methyl-17α-valeryloxypregna-1,4-diene-11β,21-diol-3,20-dione,
9α-fluoro-16β-methyl-17α-valeroxypregna-1,4-diene-11β,21-diol-3,20-dione,
6α,9α-difluoro-16α-methylpregna-1,4-diene-11β,17α,21-triol-3,20-dione,
6α-fluoro-16α-methylpregna-1,4-diene-11β,17α,21-triol-3,20-dione,
6α,21-difluoro-9α,11β-dichloro-16α,17α-isopropylidenedioxypregna-1,4-diene-3,20-dione,
6α-fluoro-9α,11β,21-trichloro-16α,17α-isopropylidenedioxypregna-1,4-diene-3,20-dione,
6α,9α,11β,21-tetrachloro-16α,17α-isopropylidenedioxypregna-1,4-diene-3,20-dione,
9α-fluoro-16α-methylpregna-1,4-diene-11β,17α,21-triol-3,20-dione,
6α,7α-difluoromethylenepregn-4-ene-11β,17α,21-triol-3,20-dione,
6α,7α-methylenepregn-4-ene-11β,17α,21-triol-3,20-dione,
6α-methylpregna-1,4-diene-11β,17α,21-triol-3,20-dione,
6α,9α-difluoropregna-1,4,6-triene-11β,17α,21-triol-3,20-dione,
6α,9α-difluoro-16α,17α-isopropylidenedioxypregna-1,4,6-triene-11β,21-diol-3,20-dione,
6α-fluoro-16α-methylpregna-1,4-diene-11β,21-diol-3,20-dione,
16α-acetoxypregn-4-ene-11β,21-diol-3,20-dione, and
16β-acetoxypregn-4-ene-11β,21-diol-3,20-dione.

Representative glycerol ketals of progestational steroids of this invention can be represented by the following formulas:

In the above formulas,
$R^{13}$ is hydrogen or methyl;
$R^{16}$ is hydroxy or conventional hydrolyzable esters or ethers thereof;
$R^{17}$ is methyl or ethyl;
$R^{18}$ is lower alkenyl, such as vinyl and propenyl, lower alkynyl (including lower haloalkynyl with a halogen, such as fluoro, chloro, or bromo), such as ethynyl, fluoroethynyl, chloroethynyl, propynyl, trifluoropropynyl, and the like, and $$\cdots C\!\!=\!\!\!=\!\!CH \atop \diagdown C \diagup \atop R^{19} \quad R^{20}$$

wherein
$R^{19}$ and $R^{20}$ each is hydrogen, chloro, or fluoro;
$R^{21}$, $R^{22}$ and $R^{25}$ each is hydrogen, methyl, fluoro, or chloro;
In Formula VIII when $Z^5$ is a double bond, $R^{21}$ is absent;
In Formula XI when $Z^7$ is a single bond, $R^{21}$ can have either an α or β orientation;
$R^{36}$ and $R^{37}$ each is hydrogen or, taken together, a methylene group having the formula $$\diagdown C \diagup R^{38} \atop \diagup \diagdown R^{39}$$

wherein
$R^{38}$ and $R^{39}$ each is hydrogen, chloro, or fluoro;
$R^{40}$ is keto or $$R^{41} \atop |\cdots H$$

wherein $R^{41}$ is hydrogen, chloro, or hydroxyl; and when $R^{41}$ is hydrogen, $R^{13}$ and $R^{42}$ is hydrogen;
$R^{42}$ is hydrogen, chloro, or fluoro;
$R^{43}$ is methylene, $$R^{44} \atop |\cdots R^{45}$$

wherein $R^{44}$ and $R^{45}$ each is hydrogen or methyl, or taken together with $R^{48}$ is $$\cdots O \quad R^{46} \atop \diagdown C \diagup \atop \cdots O \diagup \diagdown R^{47}$$

wherein
$R^{46}$ and $R^{47}$ each is hydrogen, alkyl, or aryl, the latter two groups having up to eight carbons;
$R^{48}$ is hydrogen, hydroxyl, or conventional hydrolyzable esters thereof;
$R^{49}$ is hydrogen or fluoro;
$Z^5$ and $Z^6$ each is a single bond or double bond; and
$Z^7$ is a single bond, double bond, or a single bond in combination with a methylene group having the formula $$\sim C \sim \atop \diagup \diagdown \atop R^{51} \quad R^{52}$$

wherein $R^{51}$ and $R^{52}$ each is hydrogen, chloro, or fluoro.

The glycerol ketals of Formulas VIII–XI inclusive, are progestational agents useful in the treatment of menstrual disorders and fertility control and can be used in the same manner as 17α - acetoxy - 6 - chloropregna - 4,6 - diene-3,20-dione (chloromadinone acetate). The 16-methylene species are particularly useful in estrus synchronization in domestic animals. These compounds are preferably administered orally but they can also be administered parenterally. In any mode of administration the conjugates can be used either alone or in conjunction with other medicinal agents, or in pharmaceutically acceptable, non-toxic compositions formed by the incorporation of any of the normally employed excipients.

Representative progestational steroid glycerol ketals according to this invention (of Formula I) can be prepared from the following exemplary ketones by the above procedure.

TABLE C pregn-4-en-3β-ol-20-one,
6-chloro-17α-acetoxypregna-4,6-dien-3β-ol-20-one,
6-chloro-17β-acetoxy-19-norpregna-4,6-dien-3β-ol-20-one,
1α,2α-methylene-6-chloro-17α-acetoxypregna-4,6-dien-3β-ol-20-one,
6-methyl-17α-acetoxypregna-4,6-dien-3β-ol-20-one,
6-methyl-17α-acetoxy-19-norpregna-4,6-dien-3β-ol-20-one,
6-chloro-16-methylene-17α-acetoxypregna-4,6-dien-3β-ol-20-one,
6-methyl-16-methylene-17α-acetoxypregna-4,6-dien-3β-ol-20-one,
6α-chloro-16-methylene-17α-acetoxypregn-4-en-3β-ol-20-one,
6β-chloro-16-methylene-17α-acetoxypregn-4-en-3β-ol-20-one,
6α-methyl-16-methylene-17α-acetoxypregn-4-en-3β-ol-20-one,
16α,17α-isopropylidenedioxypregn-4-en-3β-ol-20-one,
6α-fluoro-16α-methylpregn-4-en-3β-ol-20-one,
6β-fluoro-16α-methylpregn-4-en-3β-ol-20-one,
6α-fluoro-16β-methylpregn-4-en-3β-ol-20-one,
6β-fluoro-16β-methylpregn-4-en-3β-ol-20-one,
16α,17α-methylphenylmethylenedioxypregn-4-en-3β-ol-20-one,
6β-fluoro-6α,7α-difluoromethylene-17α-acetoxypregn-4-en-3β-ol-20-one,
6α-fluoro-17α-acetoxypregn-4-en-3β-ol-20-one,
6,9α,11β-trichloro-17α-acetoxypregna-4,6-dien-3β-ol-20-one,
6-chloro-9α-fluoro-17α-acetoxypregna-4,6-dien-3β,11β-diol-20-one,
6-chloro-17α-caproyloxypregna-4,6-dien-3β-ol-20-one,
6α-methylpregn-4-en-3β-ol-11,20-dione,
9α,11β-dichloropregn-4-en-3β-ol-20-one,
9α-fluoropregn-4-en-3β,11β-diol-20-one,
6-methylpregna-4,6-dien-3β-ol-11,20-dione,
6-methyl-17α-acetoxypregna-4,6-dien-3β-ol-11,20-dione,
6α,16α-dimethylpregn-4-en-3β-ol-20-one,
pregn-4-en-3β-ol-11β,20-dione,
pregna-1,4-diene-3,20-dione,
1α,2α-methylene-6α-methylpregn-4-ene-3,20-dione,
1α,2α-difluoromethylene-6α-chloropregn-4-ene-3,20-dione,
1β,2β-isopropylidene-6α,9α-difluoropregn-4-ene-3,20-dione,
11β-hydroxypregn-4-ene-3,20-dione,
11β-hydroxypregna-4,6-diene-3,20-dione,
6α,16α-dimethyl-9α-fluoro-17α-valeroxypregna-4,6-diene-3,20-dione,
17α-ethynyl-17β-hydroxy-18-methyl-19-norandrost-4-en-3-one,
6α-chloro-17α-ethynyl-17β-hydroxy-19-norandrost-4-en-3-one,
6α-chloro-17α-ethynyl-17β-hydroxy-18-methyl-19-norandrost-4-en-3-one,
6α-fluoro-17α-ethynyl-17β-hydroxy-19-norandrost-4-en-3-one,
6α-fluoro-17α-ethynyl-17β-hydroxy-18-methyl-19-norandrost-4-en-3-one,
6α-methyl-17α-ethynyl-17β-hydroxy-19-norandrost-4-en-3-one,
6α-methyl-17α-ethynyl-17β-hydroxy-18-methyl-19-norandrost-4-en-3-one,
6β-methyl-17α-ethynyl-17β-hydroxy-19-norandrost-4-en-3-one,
6β-chloro-17α-ethynyl-17β-hydroxy-19-norandrost-4-en-3-one,
6β-fluoro-17α-ethynyl-17β-hydroxy-19-norandrost-4-en-3-one,
6α,6β-difluoro-17α-ethynyl-17β-hydroxy-19-norandrost-4-en-3-one,
6α-methyl-17α-methylethynyl-17β-hydroxy-19-norandrost-4-en-3-one,
17α-methylethynyl-17β-hydroxy-19-norandrost-4-en-3-one,
17α-chloroethynyl-17β-hydroxy-19-norandrost-4-en-3-one,
17α-fluoroethynyl-17β-hydroxy-19-norandrost-4-en-3-one,
6α-methyl-17α-fluoroethynyl-17β-hydroxy-18-methyl-19-norandrost-4-en-3-one,
17α-ethynyl-17β-hydroxyandrost-4-en-3-one,
17α-ethynyl-17β-hydroxy-18-methylandrost-4-en-3-one,
6α-chloro-17α-ethynyl-17β-hydroxyandrost-4-en-3-one,
6α-chloro-17α-ethynyl-17β-hydroxy-18-methylandrost-4-en-3-one,
6α-fluoro-17α-ethynyl-17β-hydroxyandrost-4-en-3-one,
6α-fluoro-17α-ethynyl-17β-hydroxy-18-methylandrost-4-en-3-one,
6α-methyl-17α-ethynyl-17β-hydroxyandrost-4-en-3-one,
6α-methyl-17α-methylethynyl-17β-hydroxyandrost-4-en-3-one,
6α-methyl-17α-ethynyl-17β-hydroxy-18-methylandrost-4-en-3-one,
6α-methyl-17α-ethynyl-17β-hydroxy-19-norandrosta-4,6-dien-3-one,
6α-methyl-17α-vinyl-17β-hydroxy-18-methylandrost-4-en-3-one,
6α-methyl-17α-vinyl-17β-hydroxy-18-methyl-19-norandrosta-4,6-dien-3-one,
6α-methyl-17α-ethynyl-17β-hydroxy-18-methyl-19-norandrosta-4,6-dien-3-one,
17α-ethynyl-19-norandrost-5(10)-en-17β-ol-3-one,
17α-ethynyl-17β-hydroxy-18-methyl-19-norandrost-5(10)-en-3-one,
17α-methylethynyl-17β-hydroxy-19-norandrost-5(10)-en-3-one,
17α-chloroethynyl-17β-hydroxy-19-norandrost-5(10)-en-3-one,
17α-fluoroethynyl-17β-hydroxy-19-norandrost-5(10)-en-3-one,
17α-methylethynyl-17β-hydroxy-18-methyl-19-norandrost-5(10)-en-3-one,
17α-chloroethynyl-17β-hydroxy-18-methyl-19-norandrost-5(10)-en-3-one,
17α-fluoroethynyl-17β-hydroxy-18-methyl-19-norandrost-5(10)-en-3-one,
17α-ethynyl-19-norandrosta-4,9(10)-dien-17β-ol-3-one,
17α-ethynyl-17β-hydroxy-18-methyl-19-norandrosta-4,9(10)-dien-3-one,
17α-fluoroethynyl-17β-hydroxy-19-norandrosta-4,9(10)-dien-3-one,
17α-fluoroethynyl-17β-hydroxy-18-methyl-19-norandrosta-4,9(10)-dien-3-one,
17α-vinyl-17β-hydroxy-19-norandrosta-4,9(10)-dien-3-one,
17α-vinyl-17β-hydroxy-18-methyl-19-norandrosta-4,9(10)-dien-3-one,
17α-(2″,2″-difluorocyclopropenyl)-17β-hydroxy-19-norandrosta-4,9(10)-dien-3-one,
17α-(2″,2″-difluorocyclopropenyl)-17β-hydroxy-18-methyl-19-norandrosta-4,9(10),11-trien-3-one,
17α-(2″,2″-difluorocyclopropenyl)-17β-hydroxy-19-norandrosta-4,9(10),11-trien-3-one,
17α-vinyl-17β-hydroxy-18-methyl-19-norandrosta-4,9(10),11-trien-3-one, 17α-vinyl-17β-hydroxy-19-norandrosta-4,9(10),11-
trien-3-one,
17α-ethynyl-17β-hydroxy-18-methyl-19-norandrosta-
4,9(10),11-trien-3-one,
17α-ethynyl-17β-hydroxy-19-norandrosta-4,9(10),11-
trien-3-one,
17α-fluoroethynyl-17β-hydroxy-18-methyl-19-
norandrosta-4,9(10),11-trien-3-one,
17α-fluoroethynyl-17β-hydroxy-19-norandrosta-4,9(10),
11-trien-3-one, and
17α-chloroethynyl-17β-hydroxy-19-norandrosta-4,9(10)-
dien-3-one.

Other glycerol ketals included within Formula I can be prepared from the following exemplary drug ketones by the above procedure, the utility for the products as listed.

TABLE D

| | |
|---|---|
| 2-bornanone | Anesthetic, expectorant. |
| 3-diethylcarbamoyl-1-methylpyridin-iumcamphor sulfonate. | Analeptic, respiratory and circulatory stimulant. |
| Carbomycin | Antimicrobial. |
| Cedrin | Antimalarial. |
| Chlortetracycline | Antimicrobial. |
| Toylmycin | Antimicrobial, antimetabolite. |
| 7-chloro-4-(dimethylamino)-1,4,4a,5,5a,6,11,12a-octahydro-3,6,10,12,12a-pentahydroxy-N-(hydroxymethyl)-6-methyl-1,11-dioxo-2-naphthacenecarboxamide. | Antimicrobial. |
| Coumingine | Cardiac tonic and stimulant. |
| 7-chloro-6-demethyltetracycline | Antimicrobial. |
| Dihydrocodeinone | Antitussive, analgesic. |
| 4-(dimethylamino)-1,4,4a,5,5a,6,11,12a-octahydro-3,5,10,12,12a-pentahydroxy-6-methyl-1,11-dioxo-2-naphthacenecarboxamide. | Antimicrobial. |
| Erythromycin A | Do. |
| Erythromycin estolate | Do. |
| Frequentin | Do. |
| 4-methoxy-5-methyl-o-phthalaldehyde-3-carboxylic acid. | Antifungal antibiotic. |
| 3β-hydroxy-11-oxoolean-12-en-30-oic acid. | Used in treatment of Addison's disease. |
| Griseofulvin | Antifungal antibiotic. |
| Isogriseofulvin | Do. |
| Dihydromorphinone | Analgesic. |
| Hydroxycodeine | Do. |
| 14-hydroxycodeinone | Do. |
| 2-(2-hydroxy-1-naphthyl)-cyclohexanone. | Antitussive. |
| 1,3,4,6,8,13-hexahydroxy-10,11-dimethyl phenanthro-[1,10.9,8-opgra]perylene-7,14-dione. | Antidepressant. |
| 5-isopropyl-3-methyl-2-cyclohexene-1-one. | CNS stimulant. |
| 5-hydroxy-1,4-naphthoquinone-4,9-dimethoxy-7-methyl-5H-furo[3,2-g][1]benzopyran-5-one. | Antihermorrheiocbroity.ovn Corinary vasodic talarcti dilator. |
| 2-hydroxy-3-(3-methyl-2-butenyl)-1,4-naphthoquinone. | Antimalarial. |
| 2-hydroxy-3-(9-hydroxy-9-pentyltetradecyl)-1,4-naphthoquinone. | Do. |
| Lucensomycin | Antifungal agent. |
| N-lysinomethyltetracycline | Antimicrobial. |
| 2-methyl-1,4-naphthoquinone | Prophylaxis. |
| Menadinone carboxymethoxime ammonium salt. | Do. |
| 4-(dimethylamino)-1,4,4a,5,5a,6,11,12a-octahydro-3,6,10,12,12a-pentahydroxy-N-{[4-(2-hydroxyethyl)-1-piperazinyl]-methyl}-6-methyl-1,11-dioxo-2-naphthacyenecarboxamide. | Antimicrobial |
| 4-dimethylamino-1,4,4a,5,5a,6,11,12a-octahydro-3,5,10,12,12a-pentahydroxy-6-methylene-1,11-dioxo-2-naphthacenecarboxamide. | Do. |
| Methyldihydromorphenone | Analgesic. |
| Methymycin | Antimicrobial. |
| 3,3-diethyl-5-methyl-2,4-piperidinedione. | Sedative. |
| Mikamycin | Antimicrobial. |
| 1-N-allyl-7,8-dihydro-14-hydroxynorphenone. | Narcotic antagonist. |
| Dihydrohydroxycodeinone | Analgesic. |
| Dihydrohydroxymorphenone | Do. |
| 2-hydroxy-3-pinanone | For respiratory insufficiency. |
| 4-(dimethylamino)-1,4,4a,5,5a,6,11,12a-octahydro-3,5,6,10,12,12a-hexahydroxy-6-methy-1,11-dioxo-2-naphthacenecarboxamide. | Antimicrobial. |
| 2-(1-cyclopentene-1-yl)-2-(2-morpholinoethyl)cyclopentanone | Antitussive. |
| Perivine | Antimetabolite. |
| Pimaricin | Antimicrobial. |
| 2-(piperidinomethyl)cyclohexanone | Respiratory stimulant. |
| 3,3-diethyl-2,4-dioxopiperidine | Sedative, antitussive. |
| 3,3',4',5,7-pentahydroxyflavone | Decreases capillary fragility. |
| N,N-diethylrifomycin B amide | Antimicrobial. |
| Rifomycin (B,S,O,SB,X,AG, etc.) | Antimicrobial. |

The preferred steroid glycerol ketals of steroids of Fomula I can be represented by the formulas:

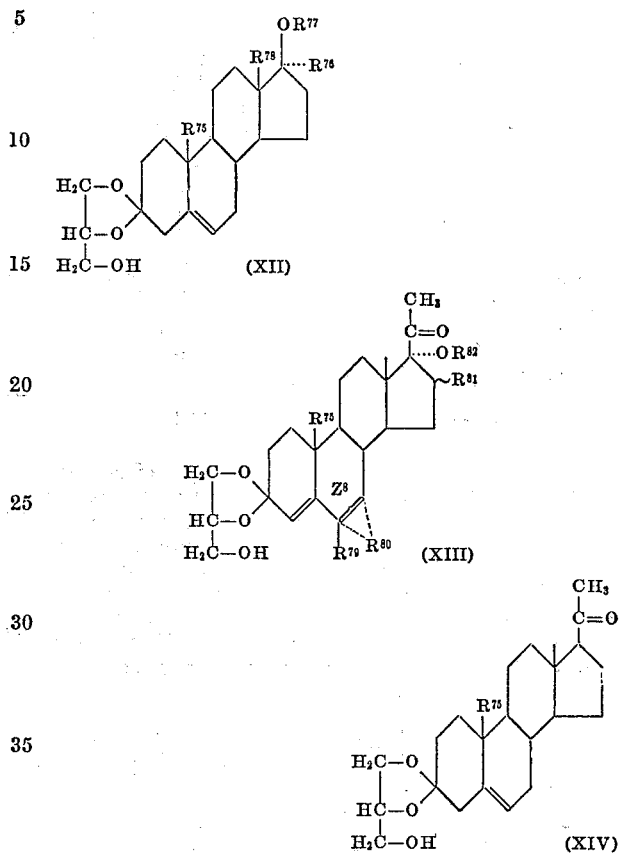

In the above formulas, $R^{75}$ and $R^{78}$ each is hydrogen or methyl;

$R^{76}$ is hydrogen, lower alkyl, cyclopropyl, lower alkenyl, lower alkynyl or propadienyl;

$OR^{77}$ is hydroxy or a conventional hydrolyzable ester thereof;

$R^{79}$ is hydrogen, chloro, fluoro or methyl;

$R^{80}$ is dihydrogen, dihalomethylene, preferably dichloromethylene or difluoromethylene, but is not present if $Z^8$ is a double bond;

$R^{81}$ is hydrogen, methyl or methylene;

$OR^{82}$ is hydroxy or a conventional hydrolyzable ester thereof; and $Z^8$ is a single bond or a double bond but is a single bond if $R^{80}$ is present.

The ketal conjugates of the compounds of Formula XII wherein $R^{76}$ is hydrogen, lower alkyl or cyclopropyl are anabolic agents with a favorable antibolic:androgenic ratio, also possess anti-estrogenic, antigonadotrophic, and anti-fibrillitory activities, and can be orally administered for the same purposes as testosterone. The ketal conjugates of the compounds of Formula XII wherein $R^{76}$ is lower alkenyl, lower alkynyl, or propadienyl and the compounds of Formula XIII are progestational agents useful in the treatment of menstrual disorders and fertility control and can be orally administered for the same purposes as 17α-acetoxy-6-chloropregna-4,6-dien-3,20-dione (chloromadanone acetate). These compounds are preferably administered orally, but they can also be administered by other routes. These compounds are administered either alone or in conjunction with other medicinal agents or in pharmaceutically acceptable, non-toxic compositions formed by the incorporation of any of the normally employed excipients.

The preferred process for preparing glycerol ketals of Formula XII and certain ketals of Formula XIII can be represented as follows:

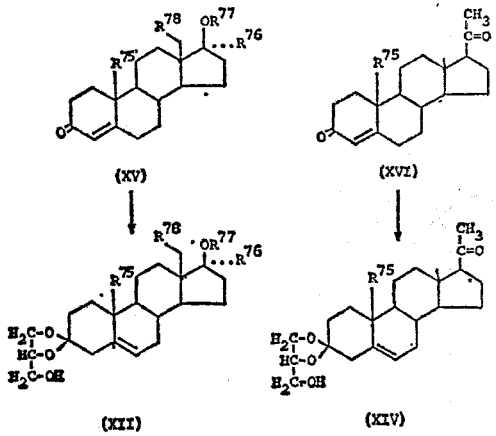

In the above formulas, $R^{75}$, $R^{76}$, $R^{77}$ and $R^{78}$ are as previously defined. The 3,3-(3-hydroxymethyl-1,2-propylenedioxy) compounds of Formulas XII and XIV are preferably prepared by reacting the respective 3-keto compounds of Formulas XV and XVI with glycerol and dry methyl orthoformate under nitrogen at room temperature in a suitable inert organic solvent such as diglyme in the presence of perchloric acid.

The other glycerol ketals of Formula XIII are preferably prepared by a process illustrated as follows:

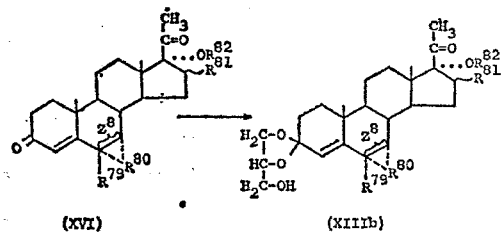

In the above formulas, $R^{79}$, $R^{80}$, $R^{81}$, $R^{82}$ and $Z^8$ are as previously defined.

The glycerol ketals of Formula XIIIb are prepared by reacting the 3-keto compounds of Formula XVI with glycerol in a chloroform solution in the presence of p-toluenesulfonic acid at reflux until the reaction is eventually complete, that is, preferably about 36 hours.

This invention is further illustrated by the following specific but non-limiting examples.

EXAMPLE 1

17β-acetoxy-17α-ethynyl-3,3-(3-hydroxy-1,2-propylenedioxy)-estr-5-ene

17β-acetoxy-17α-ethynylestr-4-en-3-one (25.0 g.), glycerol (25 ml.) and diglyme (250 ml.), and dry methyl orthoformate (28 ml.) under nitrogen is treated with 30 drops of a solution of perchloric acid (1 drop) in diglyme (40 drops), and is maintained at room temperature for 2 hours. One milliliter of pyridine is added to the reaction mixture. The reaction mixture is mixed with water, filtered, and the filtered solids are dissolved in ether, dried and chromatographed on silica gel to yield 17β-acetoxy-17α-ethynyl-3,3'-(3-hydroxyl - 1,2 - propylenedioxy)estr-5-ene.

EXAMPLE 2

Other 3,3-(3-hydroxy-1,2-propylenedioxy)-Δ⁵-steroids

Repeating the procedure of Example 1 with

17β-acetoxy-17α-ethynylestr-4-en-3-one,
17β-acetoxy-17α-ethyl-18-methylestr-4-en-3-one,
17β-acetoxy-17α-ethynyl-18-methylestr-4-en-3-one
17β-acetoxy-17α-propadienylestr-4en-3-one,
17β-acetoxy-18-methyl-17α-propadienylestr-4-en-3-one,
17β-acetoxy-18-methyl-17α-propynylestr-4-en-3-one,
17β-acetoxy-17α-ethylandrost-4-en-3-one,
17β-acetoxy-17α-ethyl-18-methylandrost-4-en-3-one,
17β-acetoxy-17α-ethynylandrost-4-en-3-one,
17β-acetoxy-17α-ethynyl-18-methylandrost-4-en-3-one,
17β-acetoxy-17α-propadienylandrost-4-en-3-one,
17β-acetoxy-18-methyl-17α-propadienylandrost-4-en-3-one, and
17β-acetoxy-18-methyl-17α-propynylandrost-4-en-3-one,
yields the corresponding
17β-acetoxy-17α-ethyl-3,3-(3-hydroxy-1,2-propylenedioxy)-estr-5-ene,
17β-acetoxy-17α-ethyl-3,3-(3-hydroxy-1,2-propylenedioxy)-18-methylestr-5-ene,
17β-acetoxy-17α-ethynyl-3,3-(3-hydroxyl-1,2-propylenedioxy)-18-methylestr-5-ene,
17β-acetoxy-3,3-(3-hydroxy-1,2-propylenedioxy)-17α-propadineylestr-5-ene,
17β-acetoxy-3,3-(3-hydroxy-1,2-propylenedioxy)-18-methyl-17α-propadienylestr-5-ene,
17β-acetoxy-3,3-(3-hydroxy-1,2-propylenedioxy)-18-methyl-17α-propynylestr-5-ene,
17β-acetoxy-17α-ethyl-3,3-(3-hydroxy-1,2-propylenedioxy)-androst-5-ene,
17β-acetoxy-17α-ethyl-3,3-(3-hydroxy-1,2-propylenedioxy)-18-methylandrost-5-ene,
17β-acetoxy-17α-ethynyl-3,3-(3-hydroxy-1,2-propylenedioxy)-androst-5-ene,
17β-acetoxy-17α-ethynyl-3,3-(3-hydroxy-1,2-propylenedioxy)-18-methylandrost-5-ene,
17β-acetoxy-3,3-(3-hydroxy-1,2-propylenedioxy)-17α-propadienylandrost-5-ene,
17β-acetoxy-3,3-(3-hydroxy,1,2-propylenedioxy)-18-methyl-17α-propadienylandrost-5-ene,
17β-acetoxy-3,3-(3-hydroxy-1,2-propylenedioxy)-18-methyl-17α-propynylandrost-5-ene, and
17β-acetoxy-3,3-(3-palmitoyloxy-1,2-propylenedioxy)-18-methyl-17α-propynylandrost-5-ene.

Repeating the above procedure with other fatty acids yields the corresponding 3,3-[3-(fatty acyloxy)-1,2-propylenedioxy] compounds.

EXAMPLE 3

Repeating the procedure of Example 1 with pregn-4-ene-3,20-dione and 19-norpregn-4-ene-3,20-dione yields the corresponding 3,3-(3-hydroxy-1,2-propylenedioxy)pregn-5-en-20-one, and
3,3-(3-hydroxy-1,2-propylenedioxy)-19-norpregn-5-en-20-one.

EXAMPLE 4

17α-acetoxy-6-chloro-3,3-(3-hydroxy-1,2-propylenedioxy)pregna-4,6-dien-20-one

17α-acetoxy-6-chloropregna - 4,6 - diene-3,20-dione (2.0 g.) in chloroform (100 ml.) is mixed with glycerol (0.5 g.) and p-toluenesulfonic acid (50 mg.), and the mixture is refluxed for 24 hours, the solvent being dried with molecular sieve in a Soxlet apparatus. The reaction mixture is then washed with aqueous sodium bicarbonate solution, dried, evaporated, and the residue is recrystallized from diethyl ether to yield 17α-acetoxy-6-chloro-3,3-(3-hydroxy-1,2-propylenedioxy)pregna-4,6-dien-20-one.

EXAMPLE 5

Other 3,3-(3-hydroxy-1,2-propylenedioxy-Δ⁴-steroids and -Δ⁴,⁶-steroids

Repeating the procedure of Example 4 with

17α-acetoxy-6-chloro-16β-methylpregna-4,6-dien-3,20-dione,
17α-acetoxy-6-chloro-16-methylenepregna-4,6-dien-3,20-dione,
6-chloro-17α-hydroxypregna-4,6-diene-3,20-dione, 6-chloro-17α-hydroxy-16β-methylpregna-4,6-diene-
3,20-dione,
6-chloro-17α-hydroxy-16-methylenepregna-4,6-diene-
3,20-dione,
17α-acetoxy-6-fluoropregna-4,6-dien-3,20-dione,
17α-acetoxy-6-fluoro-17β-methylpregna-4,6-diene-
3,20-dione,
17α-acetoxy-6-fluoro-16-methylenepregna-4,6-diene-
3,20-dione,
6-fluoro-17α-hydroxypregna-4,6-diene-3,20-dione,
6-fluoro-17α-hydroxy-16β-methylpregna-4,6-diene-
3,20-dione,
6-fluoro-17α-hydroxy-16-methylenepregna-4,6-diene-
3,20-dione,
17α-acetoxy-6-methylpregna-4,6-diene-3,20-dione,
17α-acetoxy-6,16β-dimethylpregna-4,6-diene-3,20-dione,
17α-acetoxy-16-methylene-6-methylpregna-4,6-diene-
3,20-dione,
17α-hydroxy-6-methylpregna-4,6-diene-3,20-dione,
17α-hydroxy-6,16β-dimethylpregna-4,6-diene-3,20-dione,
17α-hydroxy-16-methylene-6-methylpregna-4,6-diene-
3,20-dione,
17α-acetoxy-6β-chloro-6α,17α-difluoromethylenepregn-
4-ene-3,20-dione,
17α-acetoxy-6β-chloro-6α,7α-difluoromethylene-16-
methylenepregn-4-ene-3,20-dione,
6β-chloro-6α,7α-difluoromethylene-17α-hydroxypregn-
4-ene-3,20-dione,
6β-chloro-6α,7α-difluoromethylene-17α-hydroxy-16α-
methylenepregn-4-ene-3,20-dione,
17α-acetoxy-6β-fluoro-6α,7α-difluoromethylenepregn-
4-ene-3,20-dione,
17α-acetoxy-6β-fluoro-6α,7α-difluoromethylene-16-meth-
ylenepregn-4-ene-3,20-dione,
6β-fluoro-6α,7α-difluoromethylene-17α-hydroxypregn-
4-ene-3,20-dione, and
6β-fluoro-6α,7α-difluoromethylene-17α-hydroxy-16-
methylenepregn-4-ene-3,20-dione yields the
corresponding
17α-acetoxy-6-chloro-3,3-(3-hydroxy-1,2-propylene-
dioxy)-pregna-4,6-dien-20-one,
17α-acetoxy-6-chloro-3,3-(3-hydroxy-1,2-propylene-
dioxy)-16β-methylpregna-4,6-dien-20-one,
17α-acetoxy-6-chloro-3,3-(3-hydroxy-1,2-propylene-
dioxy)-16-methylenepregna-4,6-dien-20-one,
6-chloro-17α-hydroxy-3,3-(3-hydroxy-1,2-propylene-
dioxy)-pregna-4,6-dien-20-one,
6-chloro-17α-hydroxy-3,3-(3-hydroxy-1,2-propylene-
dioxy)-16β-methylpregna-4,6-dien-20-one,
6-chloro-17α-hydroxy-3,3-(3-hydroxy-1,2-propylene-
dioxy)-16-methylenepregna-4,6-dien-20-one,
17α-acetoxy-6-fluoro-3,3-(3-hydroxy-1,2-propylene-
dioxy)-pregna-4,6-dien-20-one,
17α-acetoxy-6-fluoro-3,3-(3-hydroxy-1,2-propylene-
dioxy)-16β-methylpregna-4,6-dien-20-one,
17α-acetoxy-6-fluoro-3,3-(3-hydroxy-1,2-propylene-
dioxy)-16-methylenepregna-4,6-dien-20-one,
6-fluoro-17α-hydroxy-3,3-(3-hydroxy-1,2-propylene-
dioxy)-pregna-4,6-dien-20-one,
6-fluoro-17α-hydroxy-3,3-(3-hydroxy-1,2-propylene-
dioxy)-16β-methylpregna-4,6-dien-20-one,
6-fluoro-17α-hydroxy-3,3-(3-hydroxy-1,2-propylene-
dioxy)-16-methylenepregna-4,6-dien-20-one,
17α-acetoxy-3,3-(3-hydroxy-1,2-propylenedioxy)-
6-methylpregna-4,6-dien-20-one,
17α-acetoxy-3,3-(3-hydroxy-1,2-propylenedioxy)-
6,16β-dimethylpregna-4,6-dien-20-one,
17α-acetoxy-3,3-(3-hydroxy-1,2-propylenedioxy)-
16-methylene-6-methylpregna-4,6-dien-20-one,
17α-hydroxy-3,3-(3-hydroxy-1,2-propylenedioxy)-
6-methylpregna-4,6-dien-20-one,
17α-hydroxy-3,3-(3-hydroxy-1,2-propylenedioxy)-
6,16β-dimethylpregna-4,6-dien-20-one,
17α-hydroxy-3,3-(3-hydroxy-1,2-propylenedioxy)-
16-methylene-6-methylpregna-4,6-dien-20-one, 17α-acetoxy-6β-chloro-6α,7α-difluoromethylene-3,3-
(3-hydroxy-1,2-propylenedioxy)-pregn-4-en-20-one,
17α-acetoxy-6β-chloro-6α,7α-difluoromethylene-3,3-
(3-hydroxy-1,2-propylenedioxy)-16-methylene-
pregn-4-en-20-one,
6β-chloro-6α,7α-difluoromethylene-17α-hydroxy-3,3-
(3-hydroxy-1,2-propylenedioxy)-pregn-4-en-20-one,
6β-chloro-6α,7α-difluoromethylene-17α-hydroxy-3,3-
(3-hydroxy-1,2-propylenedioxy)-16-methylene-
pregn-4-en-20-one,
17α-acetoxy-6β-fluoro-6α,7α-difluoromethylene-3,3-
(3-hydroxy-1,2-propylenedioxy)-pregn-4-en-20-one,
17α-acetoxy-6β-fluoro-6α,7α-difluoromethylene-3,3-
(3-hydroxy-1,2-propylenedioxy)-16-methylene-
pregn-4-en-20-one,
6β-fluoro-6α,7α-difluoromethylene-17α-hydroxy-3,3-
(3-hydroxy-1,2-propylenedioxy)-pregn-4-en-
20-one, and
6β-fluoro-6α,7α-difluoromethylene-17α-hydroxy-3,3-
(3-hydroxy-1,2-propylenedioxy)-16-methylene-
4-en-20-one, respectively.

I claim:
1. A compound selected from the group of compounds represented by the formulas:

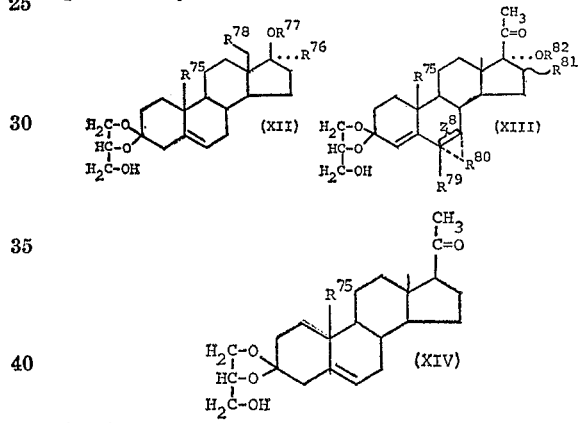

wherein
$R^{75}$ and $R^{78}$ each is hydrogen or methyl,
$R^{76}$ is hydrogen, lower alkyl, cyclopropyl, lower alkenyl, lower alkynyl or propadienyl;
$OR^{77}$ is hydroxy or a hydrolyzable ester thereof having from 1 to 12 carbons;
$R^{79}$ is hydrogen, chloro, fluoro or methyl;
$R^{80}$ is dihydrogen, dihalomethylene, but is not present if $Z^8$ is a double bond;
$R^{81}$ is hydrogen, methyl, or methylene;
$OR^{82}$ is hydroxy or a hydrolyzable ester thereof having from 1 to 12 carbons;
$Z^8$ is a single bond or a double bond but is a single bond if $R^{80}$ is present.
2. As a compound of claim 1, 17β-acetoxy-17α-ethynyl-3,3-(3-hydroxy-1,2-propylenedioxy)estr-5-ene.
3. As a compound of claim 1, 17α-ethynyl-3,3-(3-hydroxy-1,2-propylenedioxy)estr-5-ene-17β-ol.
4. As a compound of claim 1, 17α-ethynyl-18-methyl-3,3-(3-hydroxy-1,2-propylenedioxy)estr-5-ene-17β-ol.
5. As a compound of claim 1, 3,3-(3-hydroxy-1,2-propylenedioxy)-19-norpregn-5-en-20-one.
6. As a compound of claim 1, 17α-acetoxy-6-chloro-3,3 - (3 - hydroxy-1,2-propylenedioxy)pregna-4,6-dien-20-one.
7. As a compound of claim 1, 17α-propadienyl-3,3-(3-hydroxy-1,2-propylenedioxy)estr-5-ene-17β-ol.

References Cited
UNITED STATES PATENTS
3,466,276  9/1969  Campbell et. al. ___ 260—239.55

ELBERT L. ROBERTS, Primary Examiner